(12) United States Patent
Yoon et al.

(10) Patent No.: US 7,965,018 B2
(45) Date of Patent: Jun. 21, 2011

(54) ACOUSTIC SENSOR WITH PIEZO-ARRANGEMENT FILM

(75) Inventors: Dong Jin Yoon, Daejeon (KR); Young Sup Lee, Daejeon (KR); Jae Hwa Kwon, Daegu (KR)

(73) Assignee: Korea Research Institute of Standards and Science, Daejeon (KR)

( * ) Notice: Subject to any disclaimer, the term of this patent is extended or adjusted under 35 U.S.C. 154(b) by 0 days.

(21) Appl. No.: 12/515,485

(22) PCT Filed: Jul. 27, 2007

(86) PCT No.: PCT/KR2007/003639
§ 371 (c)(1),
(2), (4) Date: Feb. 4, 2010

(87) PCT Pub. No.: WO2008/082053
PCT Pub. Date: Jul. 10, 2008

(65) Prior Publication Data
US 2010/0141090 A1 Jun. 10, 2010

(30) Foreign Application Priority Data

Dec. 28, 2006 (KR) .................. 10-2006-0136408

(51) Int. Cl.
*H01L 41/08* (2006.01)
*G01N 29/00* (2006.01)
*G01H 11/08* (2006.01)
*H01P 1/20* (2006.01)

(52) U.S. Cl. ....... 310/338; 310/324; 333/208; 333/81 B; 73/591; 73/645

(58) Field of Classification Search .................. 310/322, 310/324, 328, 338, 348; 333/208, 81 B; 73/591, 628, 641, 645–648
See application file for complete search history.

(56) References Cited

U.S. PATENT DOCUMENTS 6,029,324 A 2/2000 Wixforth
(Continued)

FOREIGN PATENT DOCUMENTS

JP 09-243447 9/1997
(Continued)

OTHER PUBLICATIONS

International Search Report and Written Opinion for PCT/KR 2007/003639 dated Oct. 26, 2007.

*Primary Examiner* — Thomas M Dougherty
(74) *Attorney, Agent, or Firm* — Jenkins, Wilson, Taylor & Hunt, P.A.

(57) ABSTRACT

Provided is an acoustic sensor for measuring a sound wave propagating through a gas such as air or a fluid such as water and an elastic wave propagating through a solid medium, and more particularly, an acoustic sensor with a piezo-arrangement film capable of detecting frequencies in a broad band or amplifying a signal at a specific frequency by comparting a waveguide into an upper waveguide and a lower waveguide by means of a compartment diaphragm and arranging piezoelectric sensors on the compartment diaphragm in several forms. The acoustic sensor can be utilized as a resonant acoustic sensor in which the piezoelectric sensors are arranged on the compartment diaphragm in the same form so that a signal at a specific frequency overlaps for high sensibility or a broadband acoustic sensor in which the piezoelectric sensors are arranged in a different form to detect frequencies in a broad band. The sensor for measuring an acoustic wave includes a waveguide including a vibrating membrane for receiving the acoustic wave, an emitting membrane for emitting the acoustic wave, and a propagation medium filled therein for propagating the acoustic wave received by the vibrating membrane; a compartment diaphragm for computing the waveguide into an upper waveguide and a lower waveguide; an omni-directional endpoint processing unit formed at an end of the waveguide for absorbing the acoustic wave received by the vibrating membrane; and a plurality of piezoelectric sensors formed on the compartment diaphragm for detecting the acoustic wave.

14 Claims, 5 Drawing Sheets

U.S. PATENT DOCUMENTS

| | | |
|---|---|---|
| 6,236,391 B1 | 5/2001 | Kent et al. |
| 6,963,647 B1 * | 11/2005 | Krueger et al. .............. 381/71.5 |
| 2001/0033275 A1 | 10/2001 | Kent et al. |
| 2004/0060358 A1 | 4/2004 | Datskos |
| 2004/0107773 A1 * | 6/2004 | Dunegan ........................ 73/587 |
| 2009/0245028 A1 * | 10/2009 | Donskoy et al. .............. 367/172 |

FOREIGN PATENT DOCUMENTS

| | | |
|---|---|---|
| JP | 2000-205940 | 7/2000 |
| KR | 10-2005-0035869 | 4/2005 |
| KR | 10-2005-0059075 | 6/2005 |

* cited by examiner

[Fig. 1]
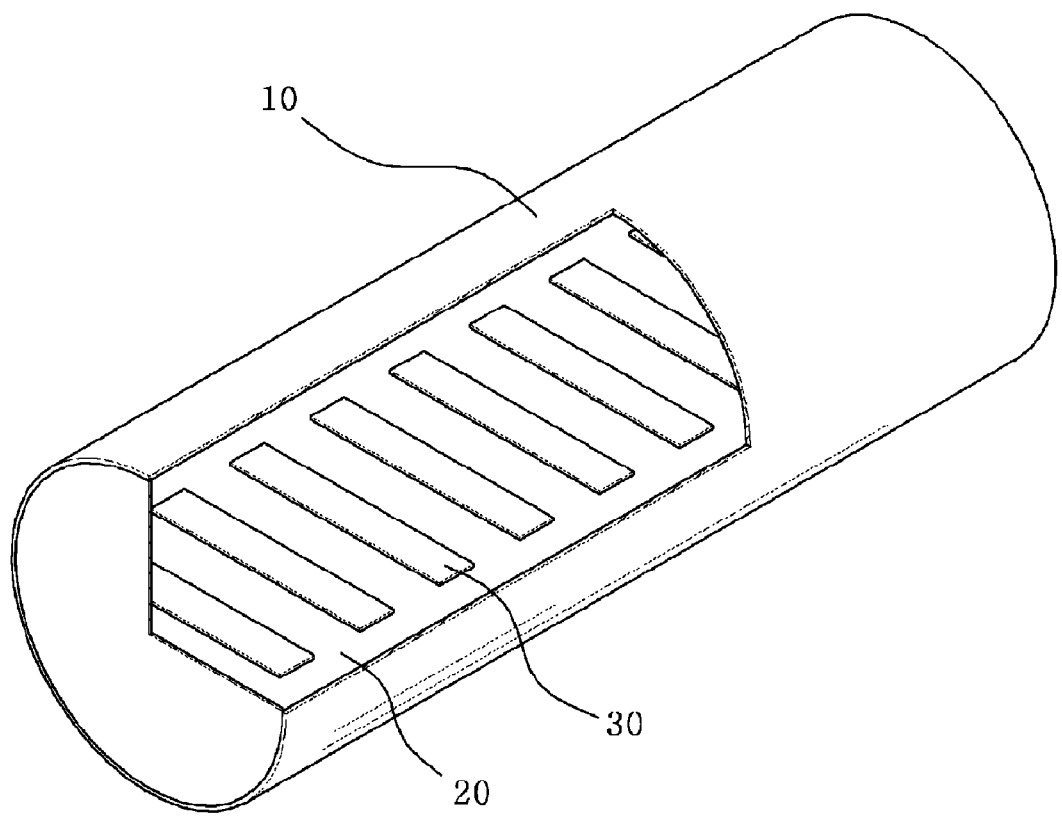
[Fig. 2]
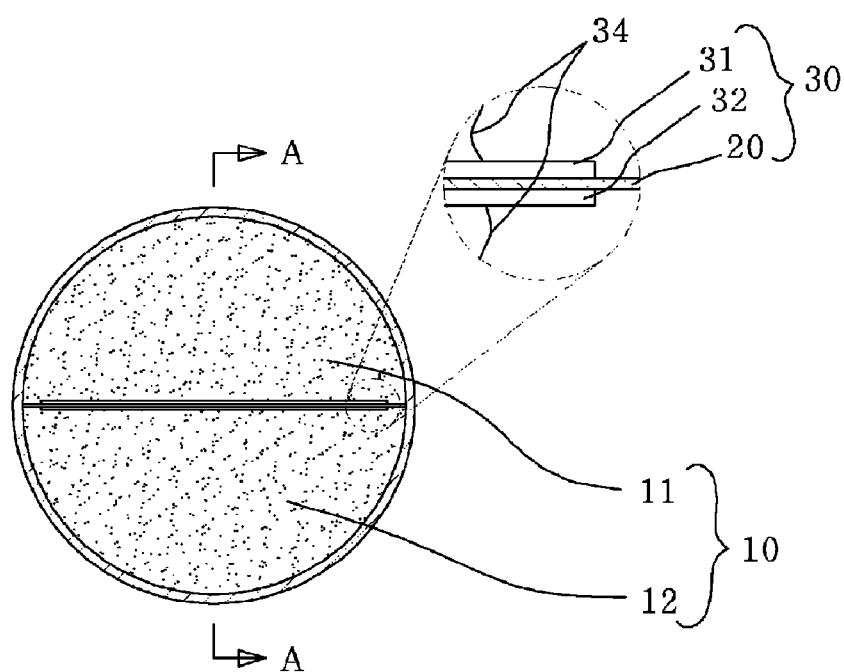

[Fig. 3]
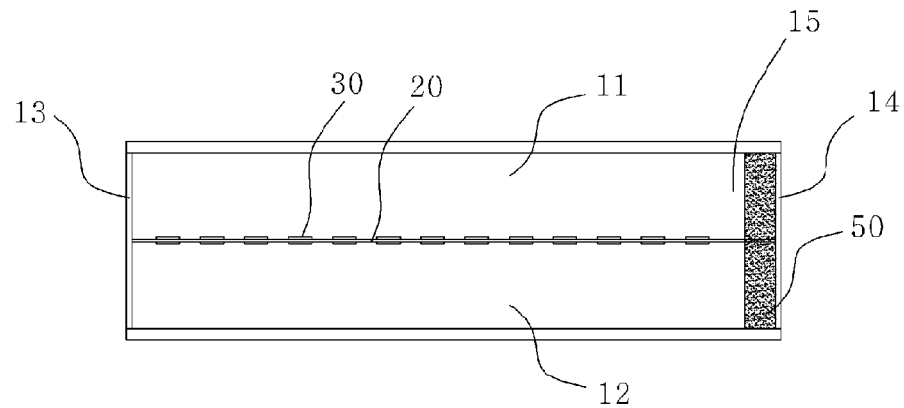
[Fig. 4]
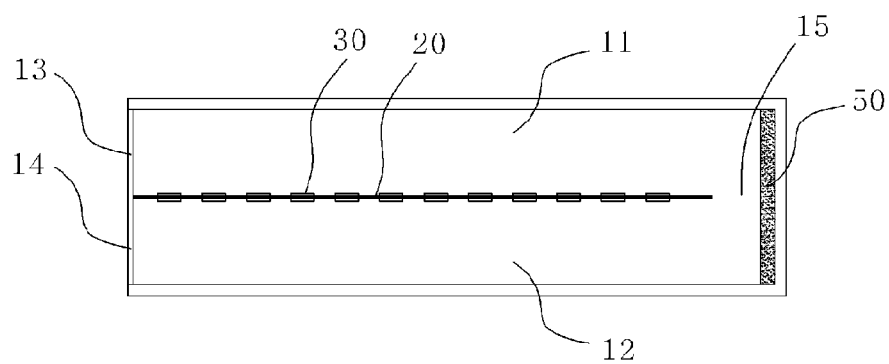
[Fig. 5]
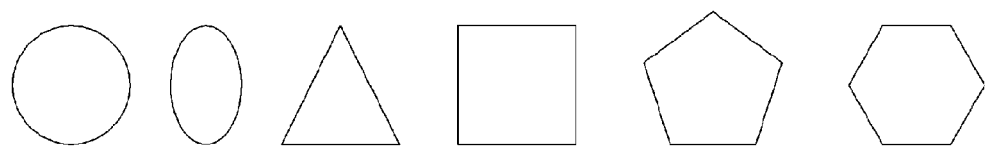
[Fig. 6]
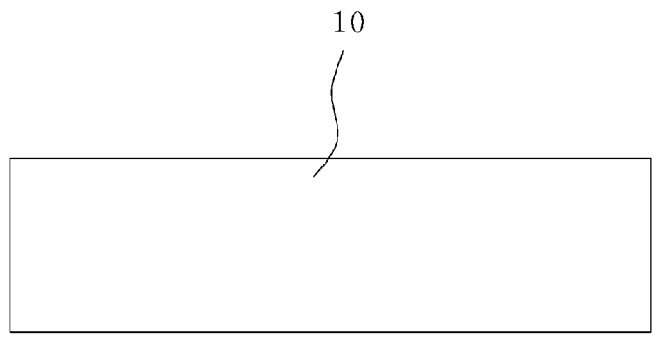

[Fig. 7]
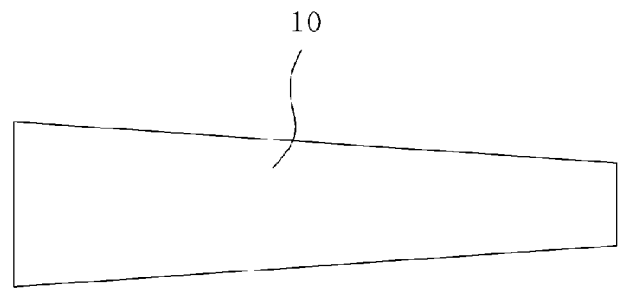
[Fig. 8]
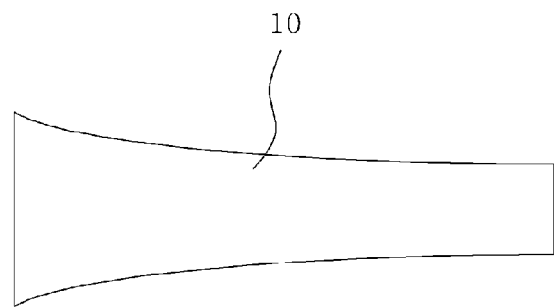
[Fig. 9]
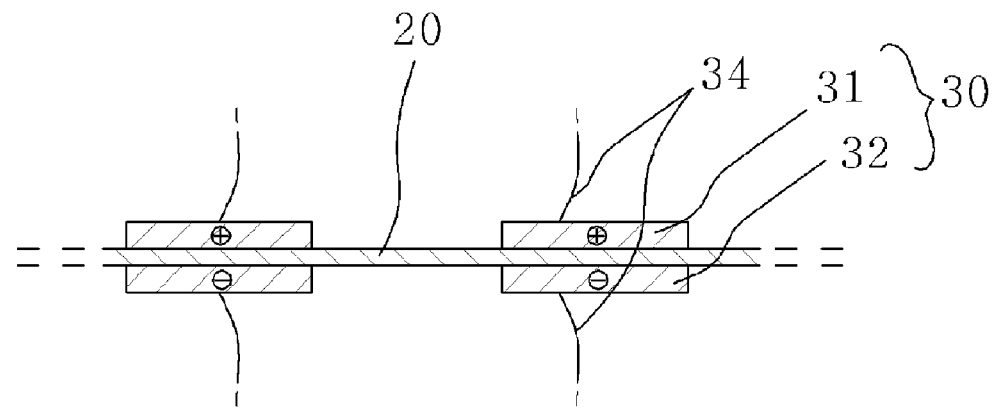
[Fig. 10]
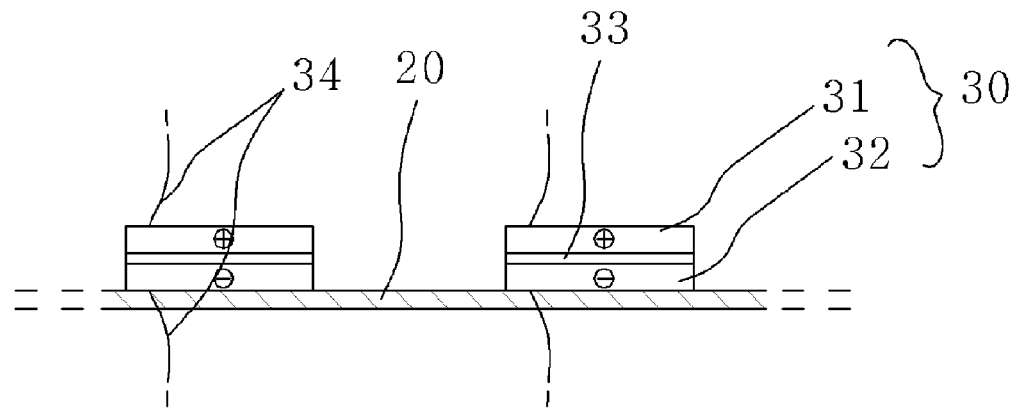

[Fig. 11]
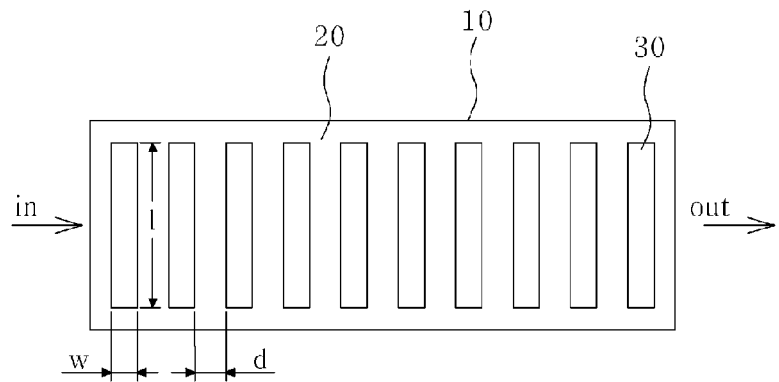
[Fig. 12]
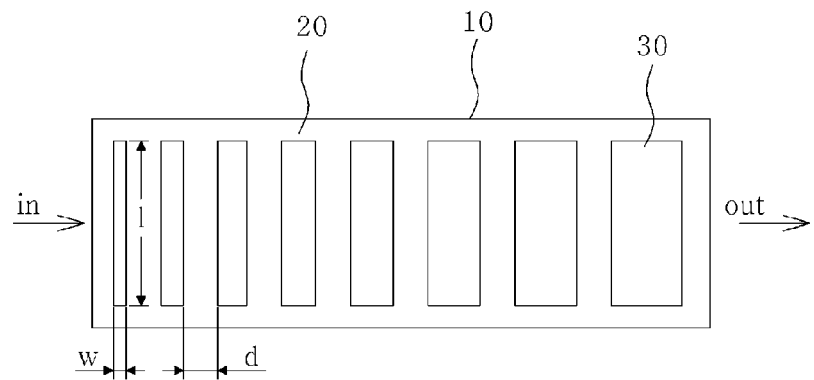
[Fig. 13]
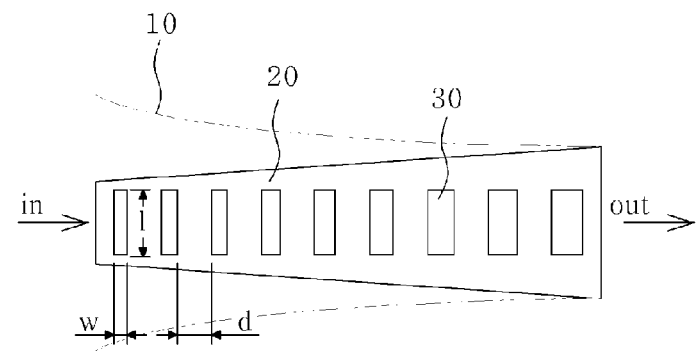
[Fig. 14]
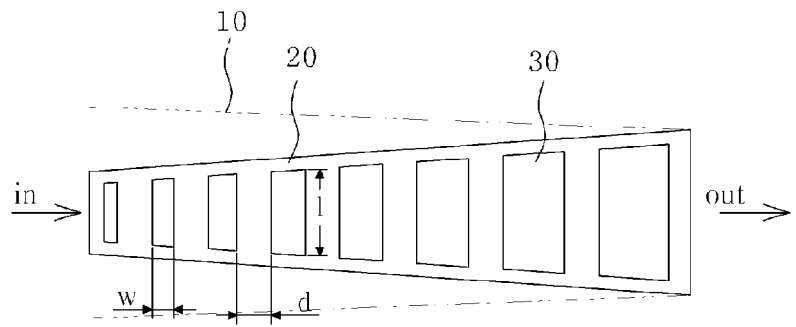

[Fig. 15]
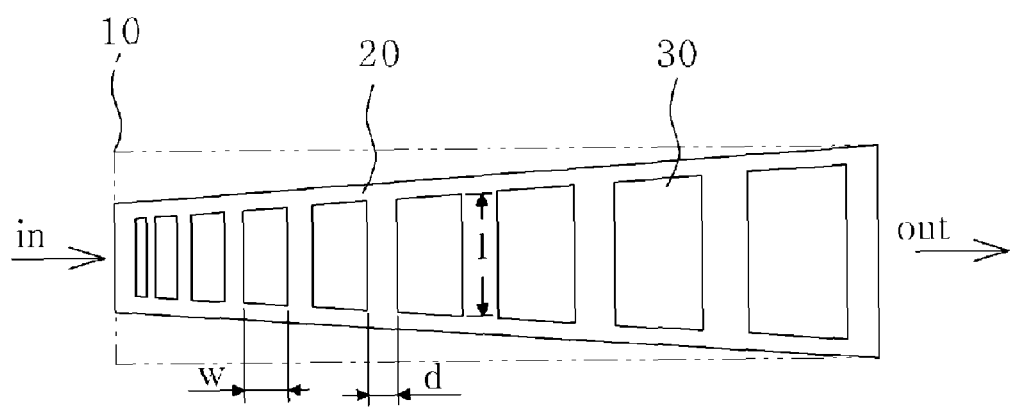

ACOUSTIC SENSOR WITH PIEZO-ARRANGEMENT FILM

TECHNICAL FIELD

The present invention relates to an acoustic sensor for measuring a sound wave propagating through a gas such as air or a fluid such as water and an elastic wave propagating through a solid medium. More particularly, the present invention relates to an acoustic sensor with a piezo-arrangement film capable of detecting frequencies in a broad band or amplifying a signal at a specific frequency by comparting a waveguide into an upper waveguide and a lower waveguide by means of a compartment diaphragm and arranging piezoelectric sensors on the compartment diaphragm in several forms.

The acoustic sensor according to the present invention can be utilized as a resonant acoustic sensor for amplifying a signal at a specific frequency by arranging piezoelectric sensors on a compartment diaphragm in the same form, or a broadband acoustic sensor for detecting frequencies in a broad band by arranging piezoelectric sensors in a different form.

BACKGROUND ART

A sound wave propagating through a gas or fluid and an elastic wave propagating through a solid medium are collectively called an "acoustic wave".

Acoustic sensors for receiving a sound wave or an ultrasonic wave and generating an electric signal corresponding to vibration of the wave may be classified into a microphone, a subaqueous sound hydrophone (i.e., a subaqueous sound locator), an ultrasonic wave sensor, a sound emitting sensor, and the like, depending on a frequency band to be measured, a medium, and an object to be measured.

Also, acoustic sensors may be generally classified into resonant acoustic sensors and broadband acoustic sensors depending on measurable frequency bandwidths.

The resonant acoustic sensors have good signal reception sensibility and a high signal-to-noise ratio (SNR) but a narrow measurable frequency band. The broadband acoustic sensors have a relatively wider measurement frequency band but bad reception sensibility and a low signal-to-noise ratio.

DISCLOSURE OF INVENTION

Technical Problem

An object of the present invention is to provide a resonant acoustic sensor or a broadband acoustic sensor using a piezoelectric material to address the aforementioned shortcomings of the conventional acoustic sensor, comprising a compartment diaphragm for comparting a waveguide into an upper waveguide and a lower waveguide, and piezoelectric sensors disposed on the compartment diaphragm in a various manner to amplify a signal at a specific frequency or detect several frequencies.

Another object of the present invention is to provide an acoustic sensor comprising a waveguide including a vibrating membrane for receiving the acoustic wave, an emitting membrane for emitting the acoustic wave, and a propagation medium filled therein for propagating the acoustic wave received by the vibrating membrane; a compartment diaphragm for comparting the waveguide into an upper waveguide and a lower waveguide; an omni-directional endpoint processing unit formed at an end of the waveguide for absorbing the acoustic wave received by the vibrating membrane; and a plurality of piezoelectric sensors formed on the compartment diaphragm for detecting the acoustic wave.

Technical Solution

One aspect of the present invention provides an acoustic sensor with a piezo-arrangement film comprising: a waveguide including a vibrating membrane for receiving the acoustic wave, an emitting membrane for emitting the acoustic wave, and a propagation medium filled therein for propagating the acoustic wave received by the vibrating membrane; a compartment diaphragm for comparting the waveguide into an upper waveguide and a lower waveguide; an omni-directional endpoint processing unit formed at an end of the waveguide for absorbing the acoustic wave received by the vibrating membrane; and a plurality of piezoelectric sensors formed on the compartment diaphragm for detecting the acoustic wave.

Advantageous Effects

As described above, the acoustic sensor according to the present invention can be utilized as a resonant acoustic sensor or a broadband acoustic sensor depending on the shape and arrangement of arranged electrodes. A combination of the resonant acoustic sensor and the broadband acoustic sensor can be utilized.

Furthermore, a small high-frequency acoustic sensor can be manufactured with the piezoelectric material.

BRIEF DESCRIPTION OF THE DRAWINGS

FIG. 1 is a perspective view illustrating an acoustic sensor according to an embodiment of the present invention;

FIG. 2 is a longitudinal sectional view illustrating the acoustic sensor according to an embodiment of the present invention;

FIG. 3 is a cross-sectional view taken along a line A-A of FIG. 2;

FIG. 4 is a cross-sectional view taken along a line A-A of FIG. 2 according to another embodiment of the present invention;

FIG. 5 is a schematic view illustrating several longitudinal sections of a waveguide according to an embodiment of the present invention;

FIG. 6 is a plan view illustrating a waveguide according to an embodiment of the present invention;

FIG. 7 is a plan view illustrating a waveguide according to another embodiment of the present invention;

FIG. 8 is a plan view illustrating a waveguide according to still another embodiment of the present invention;

FIG. 9 is a cross-sectional view illustrating a piezoelectric sensor according to an embodiment of the present invention;

FIG. 10 is a cross-sectional view illustrating a piezoelectric sensor according to another embodiment of the present invention;

FIG. 11 is a view illustrating an arrangement of a piezoelectric sensor for a resonant acoustic sensor according to an embodiment of the present invention;

FIG. 12 is a view illustrating an arrangement of a piezoelectric sensor for a broadband acoustic sensor according to an embodiment of the present invention;

FIG. 13 is a view illustrating an arrangement of a piezoelectric sensor for a broadband acoustic sensor according to another embodiment of the present invention;

FIG. 14 is a view illustrating an arrangement of a piezoelectric sensor for a broadband acoustic sensor according to still another embodiment of the present invention; and FIG. 15 is a view illustrating an arrangement of a piezoelectric sensor for a broadband acoustic sensor according to still another embodiment of the present invention.

EXPLANATION ON ESSENTIAL ELEMENTS OF DRAWINGS

10: waveguide
11: pper waveguide 12: lower waveguide
13: vibrating membrane 14: emitting membrane
20: compartment diaphragm
30: piezoelectric sensors
50: omni-directional endpoint processing unit

MODE FOR THE INVENTION

Hereinafter, exemplary embodiments of the present invention will be described in detail. However, the present invention is not limited to the exemplary embodiments disclosed below, but can be implemented in various types. Therefore, the present exemplary embodiments are provided for complete disclosure of the present invention and to fully inform the scope of the present invention to those ordinarily skilled in the art.

FIG. 1 is a perspective view illustrating an acoustic sensor according to an embodiment of the present invention. FIG. 2 is a longitudinal sectional view illustrating the acoustic sensor according to an embodiment of the present invention. FIG. 3 is a cross-sectional view taken along a line A-A of FIG. 2. FIG. 4 is a cross-sectional view taken along a line A-A of FIG. 2 according to another embodiment of the present invention.

Referring to FIGS. 1 to 4, the acoustic sensor for measuring an acoustic wave according to the present invention comprises a waveguide 10. The waveguide 10 includes a vibrating membrane 13 formed at one end thereof for receiving the acoustic wave, an emitting membrane 14 for emitting the acoustic wave received by the vibrating membrane 13, and a propagation medium filled therein for propagating the acoustic wave received by the vibrating membrane 13.

The acoustic sensor further comprises a compartment diaphragm 20 for comparting the waveguide 10 into an upper waveguide 11 and a lower waveguide 12; an omni-directional endpoint processing unit 50 formed at an end 15 of the waveguide 10 for absorbing the acoustic wave received by the vibrating membrane 13; and a plurality of piezoelectric sensors 30 formed on the compartment diaphragm 20 for detecting the acoustic wave.

As shown in FIG. 3, the vibrating membrane 13 may be disposed at one end of the waveguide 10 to receive the acoustic wave, the emitting membrane 14 may be disposed at the other end to emit the acoustic wave received by the vibrating membrane 13, and the compartment diaphragm 20 may be disposed from the vibrating membrane 13 to the emitting membrane 14. Alternatively, both the vibrating membrane 13 for receiving the acoustic wave and the emitting membrane 14 for emitting the acoustic wave received by the vibrating membrane 13 may be disposed at one end of the waveguide 10, and the compartment diaphragm 20 for providing a connection passage may be disposed at the other end, as shown in FIG. 4.

The acoustic sensor of FIG. 3 has an advantage of easiness of manufacture because of its simple structure, and the acoustic sensor of FIG. 4 has an advantage of high sensibility because of its longer acoustic wave path for reduction of effects of reflection wave.

The omni-directional endpoint processing unit 50 for absorbing the acoustic wave may be provided at the end 15 opposite to the vibrating membrane 13 of the waveguide 10.

The omni-directional endpoint processing unit 50 serves to absorb the acoustic wave, as well known in the art. The omni-directional endpoint processing unit 50 suppresses generation of a reflection wave, thereby increasing the sensibility of the acoustic sensor.

The propagation medium filled in the waveguide 10, which is comparted into the upper waveguide 11 and the lower waveguide 12, propagates the acoustic wave from the vibrating membrane 13 to the emitting membrane 14. The propagation medium is a fluid medium. Alternatively, the propagation medium may be a solid medium.

The waveguide 10 may have a cross section that is circular, elliptic, triangular, rectangular, pentagonal, etc. depending on usage, as shown in FIG. 5.

The waveguide 10 may have a plan profile as shown in FIGS. 6 to 8 depending on usage.

Specifically, the waveguide 10 may be formed in a rectangular shape as in FIG. 6, in which a cross section of an acoustic wave passage is constant, which is the simplest form considering the easiness of manufacture. Since an energy density of a propagating acoustic wave actually decreases due to the presence of a propagation medium, the waveguide 10 may be formed in a ladder shape having a gradually decreasing cross-section as shown in FIG. 7. Since the energy density of the acoustic wave decreases exponentially along the propagation path, the waveguide 10 may be formed in an exponentially decreasing shape, which is the most ideal, as in FIG. 8.

A piezoelectric material may be used for the above-configured acoustic sensor. As one example, the compartment diaphragm 20 for computing the waveguide 10 into the upper waveguide 11 and the lower waveguide 12 as shown in FIG. 9 is formed of a piezoelectric material such as a piezoelectric polymer (e.g., polyvinyliden fluoride; PVDF). As another example, a piezoelectric sensor 30 is disposed on a normal compartment diaphragm 20, and has electrodes 31 and 32 formed on upper and lower surfaces of a piezoelectric material film 33, as shown in FIG. 10.

Conductors 34 are connected to the electrodes 31 and 32 and to a signal processing unit (not shown), which processes electric signals generated by the piezoelectric sensors from the acoustic wave.

The signal processing unit for processing an electric signal generated by the acoustic sensor from the acoustic wave is well known in the art.

When the compartment diaphragm 20 is formed of a piezoelectric material, the upper electrode 31 of the piezoelectric sensor 30 is formed on an upper surface of the compartment diaphragm 20 and the lower electrode 32 on a lower surface. When the compartment diaphragm 20 is not formed of a piezoelectric material, the electrodes 31 and 32 are formed on the upper and lower surfaces of the piezoelectric material film 33, respectively.

The acoustic sensor can be utilized as a resonant acoustic sensor for amplifying a signal at a specific frequency or a broadband acoustic sensor for detecting frequencies in a broad band, depending on the shape and arrangement of a number of piezoelectric sensors 30 formed on the compartment diaphragm 20.

The acoustic sensor according to an embodiment of the present invention will now be described with reference to FIG. 8.

FIG. 11 illustrates a shape of a compartment diaphragm and an arrangement of piezoelectric sensors in a resonant acoustic sensor. The compartment diaphragm 20 is rectangular and has a constant width in a waveguide 10 along which an acoustic wave propagates. A plurality of piezoelectric sensors 30 have the same length l and width w and are disposed at the same interval d as the width w to have the same boundary condition and resonant mode.

FIGS. 12 to 15 illustrate a shape of a compartment diaphragm and an arrangement of piezoelectric sensors in a broadband acoustic sensor.

Referring to FIG. 12, a compartment diaphragm 20 has a constant width and a plurality of piezoelectric sensors 30 have a constant length l and a gradually-increasing width w. The piezoelectric sensors 30 are disposed on the compartment diaphragm 20 at the same interval d.

Referring to FIG. 13, a waveguide 10 has an exponentially-decreasing cross-section, a compartment diaphragm 20 has a gradually-increasing width, and a plurality of piezoelectric sensors 30 have a constant length l and a gradually-increasing width w. The piezoelectric sensors 30 are disposed on the compartment diaphragm 20 at the same interval d.

Referring to FIG. 14, a waveguide 10 has a gradually-decreasing cross section, a compartment diaphragm 20 has a gradually-increasing width, and piezoelectric sensors 30 have gradually-increasing length l and width w. The piezoelectric sensors 30 are disposed at the same interval d.

Referring to FIG. 15, a compartment diaphragm 20 has a width increasing in a propagation direction of an acoustic wave, and piezoelectric sensors 30 have a length l and a width w that increase with the width of the compartment diaphragm 20, and are disposed at increasing intervals d. This allows the piezoelectric sensors 30 to have different boundary conditions and resonant modes, so that a high frequency is detected at a front of the waveguide 10 and a low frequency at a rear thereof.

Thus, the piezoelectric sensors 30 may have a different length l, width w and arrangement interval d depending on usage of the acoustic sensor.

The present invention provides the piezoelectric acoustic sensor that detects the acoustic wave with the piezoelectric sensors disposed on the plane and that can be utilized in various usages depending on the size and arrangement of the piezoelectric sensors.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An acoustic sensor with a piezo-arrangement film for measuring an acoustic wave, the acoustic sensor comprising:
   a waveguide (10) including a vibrating membrane (13) for receiving the acoustic wave, an emitting membrane (14) for emitting the acoustic wave, and a propagation medium filled therein for propagating the acoustic wave received by the vibrating membrane (13);
   a compartment diaphragm (20) for comparting the waveguide (10) into an upper waveguide (11) and a lower waveguide (12);
   an omni-directional endpoint processing unit (50) formed at an end (15) of the waveguide (10) for absorbing the acoustic wave received by the vibrating membrane (13); and
   a plurality of piezoelectric sensors (30) formed on the compartment diaphragm (20) for detecting the acoustic wave.

2. The sensor according to claim 1, wherein the compartment diaphragm (20) is formed of a piezoelectric material.

3. The sensor according to claim 1, wherein the compartment diaphragm (20) connects the upper waveguide (11) and the lower waveguide (12) at the end (15).

4. The sensor according to claim 1, wherein the piezoelectric sensor (30) comprises electrodes (31) and (32) formed on upper and lower surfaces of a piezoelectric material film (33).

5. The sensor according to claim 2, wherein the piezoelectric sensor (30) comprises an upper electrode (31) formed on an upper surface of the compartment diaphragm (20), and a lower electrode (32) formed on a lower surface opposite to the upper electrode (31), the compartment diaphragm (20) being formed of a piezoelectric material.

6. The sensor according to claim 1, wherein the waveguide (10) has a cross section that is any one of circular, elliptic, rectangular, and polygonal.

7. The sensor according to claim 1, wherein the waveguide (10) is configured such that its cross section from the vibrating membrane (13) to the emitting membrane (14) is uniform.

8. The sensor according to claim 1, wherein the waveguide (10) is configured such that its plan profile is gradually decreased.

9. The sensor according to claim 1, wherein the waveguide (10) is configured such that its plan profile is exponentially decreased.

10. The sensor according to claim 1, wherein the compartment diaphragm (20) is configured to have a uniform width so that a signal at a specific frequency overlaps.

11. The sensor according to claim 1, wherein the compartment diaphragm (20) is configured such that its width is gradually increased to detect frequencies in a broad band.

12. The sensor according to claim 4, wherein the plurality of piezoelectric sensors (30) have a same length (l) and a same width (w) and are arranged at an interval (d) equal to the width (w) so that a signal at a specific frequency overlaps.

13. The sensor according to claim 4, wherein the piezoelectric sensors (30) are arranged such that a length (l) of each sensor is gradually increased to detect frequencies in a broad band.

14. The sensor according to claim 4, wherein the piezoelectric sensors (30) are arranged such that a width (w) of each sensor is gradually increased to detect frequencies in a broad band.

* * * * *